United States Patent
Tham et al.

(10) Patent No.: US 7,555,121 B2
(45) Date of Patent: Jun. 30, 2009

(54) METHODS AND APPARATUS FOR IMPLEMENTING A CRYPTOGRAPHY ENGINE

(75) Inventors: Terry K. Tham, San Jose, CA (US); Errol Lai, Mountain View, CA (US)

(73) Assignee: Broadcom Corporation, Irvine, CA (US)

(*) Notice: Subject to any disclaimer, the term of this patent is extended or adjusted under 35 U.S.C. 154(b) by 599 days.

(21) Appl. No.: 10/977,317

(22) Filed: Oct. 29, 2004

(65) Prior Publication Data

US 2005/0063538 A1  Mar. 24, 2005

Related U.S. Application Data

(62) Division of application No. 09/948,203, filed on Sep. 6, 2001.

(60) Provisional application No. 60/235,190, filed on Sep. 25, 2000.

(51) Int. Cl.
*H04K 1/00* (2006.01)
*H04L 9/00* (2006.01)
*H04L 9/38* (2006.01)
*G06F 12/14* (2006.01)
*H04L 9/32* (2006.01)

(52) U.S. Cl. ............... 380/29; 380/30; 380/28; 380/259; 380/37; 713/168; 713/171; 713/189; 713/190; 714/724

(58) Field of Classification Search .......... None
See application file for complete search history.

(56) References Cited

U.S. PATENT DOCUMENTS

| 3,962,539 | A |   | 6/1976  | Ehrsam et al. |
|-----------|---|---|---------|---------------|
| 4,914,694 | A | * | 4/1990  | Leonard et al. ............ 380/204 |
| 5,058,048 | A |   | 10/1991 | Gupta et al. |
| 5,144,574 | A |   | 9/1992  | Morita |
| 5,267,186 | A |   | 11/1993 | Gupta et al. |
| 5,297,206 | A |   | 3/1994  | Orton |
| 5,305,453 | A | * | 4/1994  | Boudry et al. ............ 713/400 |
| 5,315,178 | A |   | 5/1994  | Snider |
| 5,317,638 | A |   | 5/1994  | Kao et al. |

(Continued)

FOREIGN PATENT DOCUMENTS

EP   0 802 653 A2   10/1997

(Continued)

OTHER PUBLICATIONS

Young, Won Lim. "Efficient 8-cycle DES Implementation". ASIC 2000. Pub. Aug. 2000. Relevant pp. 175-178. Found on the World Wide Web at: http://ieeexplore.ieee.org/iel5/7202/19406/00896937.pdf?tp=&isnumber=19406&arnumber=896937&punumber=7202.*

(Continued)

*Primary Examiner*—Christopher A Revak
*Assistant Examiner*—Jeremiah Avery
(74) *Attorney, Agent, or Firm*—Sterne, Kessler, Goldstein & Fox P.L.L.C.

(57) ABSTRACT

Methods and apparatus are provided for implementing a cryptography engine for cryptography processing. A variety of techniques are described. A cryptography engine such as a DES engine running at a clock frequency higher than that of surrounding logic can be synchronized with the surrounding logic using a frequency synchronizer. Sbox logic output can be more efficiently determined by intelligently arranging Sbox input.

7 Claims, 10 Drawing Sheets

U.S. PATENT DOCUMENTS

| | | | |
|---|---|---|---|
| 5,347,580 A * | 9/1994 | Molva et al. | 713/159 |
| 5,384,723 A | 1/1995 | Karim et al. | |
| 5,426,600 A | 6/1995 | Nakagawa et al. | |
| 5,428,745 A * | 6/1995 | de Bruijn et al. | 726/3 |
| 5,459,681 A | 10/1995 | Harrison et al. | |
| 5,485,519 A | 1/1996 | Weiss | |
| 5,519,603 A * | 5/1996 | Allbery et al. | 700/4 |
| 5,561,770 A * | 10/1996 | de Bruijn et al. | 709/225 |
| 5,629,980 A | 5/1997 | Stefik et al. | |
| 5,638,367 A | 6/1997 | Gaytan et al. | |
| 5,740,249 A | 4/1998 | Shimizu et al. | |
| 5,778,071 A | 7/1998 | Caputo et al. | |
| 5,796,836 A | 8/1998 | Markham | |
| 5,796,837 A | 8/1998 | Kim et al. | |
| 5,870,474 A | 2/1999 | Wasilewski et al. | |
| 5,918,075 A | 6/1999 | Paysan | |
| 5,923,574 A | 7/1999 | Bechade | |
| 5,936,967 A | 8/1999 | Baldwin et al. | |
| 5,943,338 A | 8/1999 | Duclos et al. | |
| 6,028,939 A | 2/2000 | Yin | |
| 6,088,800 A | 7/2000 | Jones et al. | |
| 6,111,858 A | 8/2000 | Greaves et al. | |
| 6,118,300 A | 9/2000 | Wittig et al. | |
| 6,182,104 B1 | 1/2001 | Foster et al. | |
| 6,199,162 B1 * | 3/2001 | Luyster | 713/168 |
| 6,216,167 B1 | 4/2001 | Momirov | |
| 6,295,606 B1 | 9/2001 | Messerges et al. | |
| 6,356,636 B1 | 3/2002 | Foster et al. | |
| 6,360,321 B1 | 3/2002 | Gressel et al. | |
| 6,378,072 B1 | 4/2002 | Collins et al. | |
| 6,557,096 B1 | 4/2003 | Ganapathy et al. | |
| 6,704,871 B1 * | 3/2004 | Kaplan et al. | 713/192 |
| 6,708,273 B1 * | 3/2004 | Ober et al. | 713/189 |
| 6,882,727 B1 * | 4/2005 | Vialen et al. | 380/33 |
| 6,940,975 B1 * | 9/2005 | Kawamura et al. | 380/37 |
| 6,963,644 B1 | 11/2005 | Matsuzaki et al. | |
| 6,971,020 B1 | 11/2005 | Liardet et al. | |
| 6,983,366 B1 | 1/2006 | Huynh et al. | |
| 7,068,791 B1 | 6/2006 | Larsen et al. | |
| 7,162,031 B1 | 1/2007 | Roelofsen et al. | |
| 2002/0061107 A1 | 5/2002 | Tham et al. | |
| 2002/0078342 A1 | 6/2002 | Matthews, Jr. | |
| 2002/0106078 A1 | 8/2002 | Qi et al. | |
| 2002/0106080 A1 | 8/2002 | Qi et al. | |
| 2002/0108048 A1 | 8/2002 | Qi et al. | |

FOREIGN PATENT DOCUMENTS

| | | |
|---|---|---|
| EP | 0 893 751 | 1/1999 |
| EP | 1 191 736 | 3/2002 |
| EP | 1 191 738 | 3/2002 |
| GB | 2 346 239 | 8/2000 |
| WO | WO 99/14881 | 3/1999 |
| WO | WO 01/80483 | 10/2001 |

OTHER PUBLICATIONS

Bonnenberg, H. Curiger, A. Felber, N. Kaeslin, H., Lai. X. "VLSI Implementation of a New Block Cipher". ICCD '91 Proceedings. Pub. Oct. 1991. Relevant pp. 510-513. Found on the World Wide Web at: http://ieeexplore.ieee.org/iel2/367/3775/00139960.pdf?tp=&isnumber=3775&arnumber=139960&punumber=367.*

Cetin Kaya Koc, "RSA Hardware Implementation", RSA Laboratories, RSA Data Security, Inc., Redwood City, California, Version 1, Aug. 1995, 28 pages.

Zheng Qi and Mark Buer, "Methods and Apparatus for Implementing a Cryptography Engine", U.S. Appl. No. 09/892,240, filed Jun. 26, 2001, 35 pages.

Zheng Qi and Mark Buer, "Methods and Apparatus for Implementing a Cryptography Engine", U.S. Appl. No. 09/892,310, filed Jun. 26, 2001, 39 pages.

Zheng Qi and Mark Buer, "Methods and Apparatus for Implementing a Cryptography Engine", U.S. Appl. No. 09/892,242, filed Jun. 26, 2001, 35 pages.

Hi/fn, "Announcing Breakneck VPN Packet Performance", Aug. 24, 2000, pp. 1-3, obtained from http://web.archive.org/web/20000724131846/www.hifn.com/products/7811.html.

Freier, A. et al., "The SSL Protocol Version 3.0", Nov. 18, 1996, pp. 1-12, obtained from http://wp.netscape.com/eng.ssl3/draft302.txt.

Dierks, T. et al., "The TLS Protocol Version 1.0", Oct. 28, 1997, pp. 1-12, obtained from http://ww.umk.pl/~mgw/internet-drafts/draft-ietf-tls-protocol-04.txt.

Analog Devices: ADSP2141 SafeNetDPS User's Manual, Revision 6, Analog Devices Technical Specifications, Mar. 2000, XP002163401, 87 pages.

C. Madson, R. Glenn: "RFC 2403—The Use of HMAC-MD5-96 within ESP and AH", IETF Request for Comments, Nov. 1998, XP002163402, Retrieved from the Internet on Mar. 20, 2001, http://www.faqs.org/rfcs/frc2403.html, 87 pages.

S. Kent, R. Atkinson: "RFC 2406-IP Encapsulating Security Payload (ESP)" IETF Request for Comments, Nov. 1998, XP002163400, Retrieved from the Internet on Mar. 20, 2001, http://www.faqs.org/rfcs/frc2406.html, 5 pages.

Keromytis, et al., "Implementing Ipsec", Global Telecommunications Conference (Globecom), IEEE, Nov. 3, 1997, pp. 1948-1952.

Pierson, et al., "Context-Agile Encryption for high Speed Communication Networks", Computer Communications Review, Association for Computing Machinery, vol. 29, No. 1, Jan. 1999, pp. 35-49.

Sholander, et al., "The Effect of Algorithm-Agile Encryption on ATM Quality of Service", Global Telecommunciations Conference (Globecom), IEEE, Nov. 3, 1997, pp. 470-474.

Smirni, et al., "Evaluation of Multiprocessor Allocation Policies", Technical Report, Vanderbilt University, Online, 1993, pp. 1-21.

Tarman, et al., "Algorithm-Agile Encryption in ATM Networks", IEEE Computer, Sep. 1998, vol. 31, No. 1, pp. 57-64.

Wassal, et al., "A VLSI Architecture for ATM Algorithm-Agile Encryption", Proceedings Ninth Great Lakes Symposium on VLSI, Mar. 4-6, 1999, pp. 325-328.

Analog Devices: "Analog Devices and IRe Announce First DSP-Based Internet Security System-On-A-Chip", Analog Devices Press Release, Online, Jan. 19, 1999, pp. 1-3, http://content.analog.com/pressrelease/prdisplay/0,1622,16,00.html.

3Com: "3Com Launches New Era of Network Connectivity", 3Com Press Release, Jun. 14, 1999, pp. 1-3.

"Secure Products VMS115", VLSI Technology, Inc., Printed in USA, Document Control: VMS115, VI, 0, Jan. 1999, pp. 1-2.

"VMS115 Data Sheet", VLSI Technology, Inc., a subsidiary of Philips Semiconductors, Revision 2:3, Aug. 10, 1999, pp. 1-64.

"Data Sheet 7751 Encryption Processor", Network Security Processors, Jun. 1999, pp. 1-84.

Senie, D., "NAT Friendly Application Design Guidelines", Amaranth Networks, Inc., NAT Working Group, Internet-Draft, Sep. 1999, pp. 1-7.

Floyd, Sally, et al., "Random Early Detection Gateways for Congestion Avoidance", Lawrence Berkeley Laboratory, University of California, IEEE/ACM Transactions on Networking, Aug. 1993, pp. 1-32.

Egevang, K., et al., "The IP Network Address Translator (NAT)", Network Working Group, May 1994, pp. 1-10.

Pall, G.S., et al., "Microsoft Point-To-Point Encryption (MPPE) Protocol", Microsoft Corporation, Network Working Group, Internet Draft, Oct. 1999, pp. 1-12.

Deutsch, P., "Deflate Compressed Data Format Specification Version 1.3", Aladdin Enterprises, Network Working Group, May 1996, pp. 1-17.

Kent, S., "IP Authentication Header", Network Working Group, Nov. 1998, pp. 1-22.

Kent, S., et al. "IP Encapsulating Security Payload (ESP)", Network Working Group, Nov. 1998, pp. 1-22.

Maughan, D., et al., "Internet Security Association and Key Management Protocol (ISAKMP)", Network Working Group, Nov. 1998, pp. 1-20.

Harkins, D., et al., "The Internet Key Exchange (IKE)", Cisco Systems, Network Working Group, Nov. 1998, pp. 1-12.

Srisuresh, P., "Security Model with Tunnel-mode Ipsec for NAT Domains", Lucent Technologies, Networking Working Group, Oct. 1999, pp. 1-11.

Shenker, S., "Specification of Guaranteed Quality of Service", Network Working Group, Sep. 1997, pp. 1-20.

Srisuresh, P., et al., "IP Network Address Translator (NAT) Terminology and Considerations", Lucent Technologies, Network Working Group, Aug. 1999, pp. 1-30.

Kent, S., et al., "Security Architecture for the Internet Protocol", Network Working Group, Nov. 1998, pp. 1-66.

"Compression for Broadband Data Communications", BlueSteel Networks, Inc., Sep. 8, 1999, pp. 1-9.

"Securing and Accelerating e-Commerce Transactions", BlueSteel Networks, Inc., Revision 2.0, Oct. 20, 1999, pp. 1-7.

"Securing Broadband Communications" BlueSteel Networks, Inc., Sep. 8, 1999, pp. 1-10.

R. Sedgewick, "Algorithms in C- Third Edition", 1998, Addison Wesley XP002163543, pp. 573-609.

"Applied Cryptography, Second Edition", Schneider, B., 1996, John Wiley & Sons, New York, XP002184521, cited in the application, p. 442, paragraph 18.7-p. 445.

"SHA: The Secure Hash Algorithm Putting Message Digests to Work", Stallings, W., Dr. Dobbs Journal, Redwood City, CA, Apr. 1, 1994, pp. 32-34, XP000570561.

Molva, Refik, "Internet Security Architecture", Computer Networks, Apr. 23, 1999, pp. 787-804, vol. 31, No. 8, Elsevier Science Publishers B.V., Amsterdam, NL.

Dandalis, Andreas, et al., "An Adaptive Cryptographic Engine for IPSec Architectures", Field-Programmable Custom Computing Machines, Apr. 17, 2000, pp. 132-141, 2000 IEEE Symposium on Napa Valley, CA USA, Apr. 17-19, 2000, Los Alamitos, CA, USA, IEEE Comput. Soc., US.

European Search Report for European Patent Application No. 01308083.3, completed on Apr. 23, 2003 by Examiner K. Post at The Hague.

Hamer et al. "DES Cracking on the Transmogrifier 2a", CHE'99, LNCS 1717, Springer-Verlag Berlin Heidelberg, 1999, pp. 13-24.

FIPS PUB 46-3 "Data Encryption Standard (DES)", Oct. 25, 1999.

Microsoft Computer Dictionary Fifth Edition, 2002 Microsoft Corporation, p. 427.

C. Madison and N. Doraswamy, "The ESP DES-CBC Cipher Algorithm With Explicit IV", Nov. 1998, RFC 2405, 8 pages.

Bruce Schneier, *Applied Cryptography, Protocols, Algorithms, and Source Code in C*, Chapter 12, "Data Encryption Standard (DES)", 1996.

European Search Report for related EP application No. EP 01 30 8081 dated May 13, 2003.

\* cited by examiner

METHODS AND APPARATUS FOR IMPLEMENTING A CRYPTOGRAPHY ENGINE

CROSS-REFERENCE TO RELATED APPLICATION(S)

This application is a divisional of U.S. patent application Ser. No. 09/948,203, filed Sep. 6, 2001, which claims the benefit of U.S. provisional patent application No. 60/235,190, filed Sep. 25, 2000 the disclosures of which are hereby incorporated by reference in its entirety for all purposes.

BACKGROUND OF THE INVENTION

1. Field of the Invention

The present invention relates to implementing a cryptography engine. More specifically, the present invention relates to methods and apparatus for efficient performance of a cryptography algorithm such as a DES algorithm.

2. Description of Related Art

Conventional software and hardware designs for implementing various cryptography algorithms including the DES and the triple DES algorithms have significant performance limitations. Many designs for performing cryptography processing are well known in the art and are discussed, for example in Applied Cryptography, Bruce Schneier, John Wiley & Sons, Inc. (ISBN. 0471128457), incorporated by reference in its entirety for all purposes. In order to improve the speed of cryptography processing, specialized cryptography accelerators have been developed that typically out-perform similar software implementations. Examples of such cryptography accelerators include the BCM™ 5805 manufactured by Broadcom, Inc. of San Jose, Calif.

Although specialized hardware cryptography accelerators can often outperform software written to perform the same tasks, conventional hardware cryptography accelerators have significant performance limitations for implementing cryptography algorithms including the DES and the triple DES algorithms. Some performance bottlenecks include limitations related Sbox logic and clock synchronization.

It is therefore desirable to provide methods and apparatus for improving the implementation of cryptography algorithms with respect to some or all of the performance limitations noted above.

SUMMARY OF THE INVENTION

Methods and apparatus are provided for implementing a cryptography engine for cryptography processing. A variety of techniques are described. A cryptography engine such as a DES engine running at a clock frequency higher than that of surrounding logic can be synchronized with the surrounding logic using a frequency synchronizer. Sbox logic output can be more efficiently determined by intelligently arranging Sbox input.

In one embodiment, a cryptography engine for performing cryptographic operations on a data block is provided. The cryptography engine includes expansion logic configured to expand a first bit sequence into a second bit sequence by moving and duplicating selected bits in the first bit sequence to form a second bit sequence having a length greater than the length of the first bit sequence. The resulting bit sequence has duplicated bits and nonduplicated bits corresponding to a portion of the data block. The cryptography engine also includes Sbox logic coupled to the output of expansion logic, wherein nonduplicated bits are selected and provided as inputs to a critical path of the Sbox logic to perform cryptographic operations on the portion of the data block.

The Sbox logic can comprise a plurality of stages. The stages can be components such as case statements, table lookup components, or multiplexers.

In another embodiment, a method for performing cryptographic operations on a data block is provided. A first bit sequence is provided to expansion circuitry, where the expansion circuitry is configured to move and duplicate bits in the first bit sequence to output a second bit sequence having a length greater than the length of the first bit sequence. Nonduplicated bits output by the expansion circuitry are identified. Nonduplicated bits are provided to a first stage of Sbox circuitry. Duplicated bits output by the expansion circuitry are identified. The duplicated bits correspond to bits in a first bit sequence that are replicated to produce a second bit sequence. Duplicated bits and the output of the first stage of Sbox circuitry is provided to a second stage of Sbox circuitry, wherein duplicated bits are provided to the second stage of Sbox circuitry after nonduplicated bits are provided to the first stage of Sbox circuitry.

In another embodiment, a method for performing cryptographic operations on a data block is provided. Nonduplicated and duplicated bits resulting from expansion circuitry are identified. Nonduplicated bits are provided to a first stage of Sbox circuitry. Duplicated bits as well as data resulting from the first stage is provided to a second stage of Sbox circuitry.

In another embodiment, a cryptography accelerator for performing cryptography operations is provided. The cryptography accelerator includes a DES engine, a frequency synchronizer coupled to the DES engine, and surrounding logic coupled to the DES engine and the frequency synchronizer, wherein the DES engine operates at a first clock rate and the surrounding logic operates at a second clock rate different from the first clock rate.

The frequency synchronizer can use a reference clock associated with the surrounding logic to synchronize a 1× clock and a higher multiple clock associated with the DES engine. In one embodiment, the cryptography accelerator uses the negative edge of the 1× clock to catch a start signal associated with the reference clock to allow consideration of skew.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
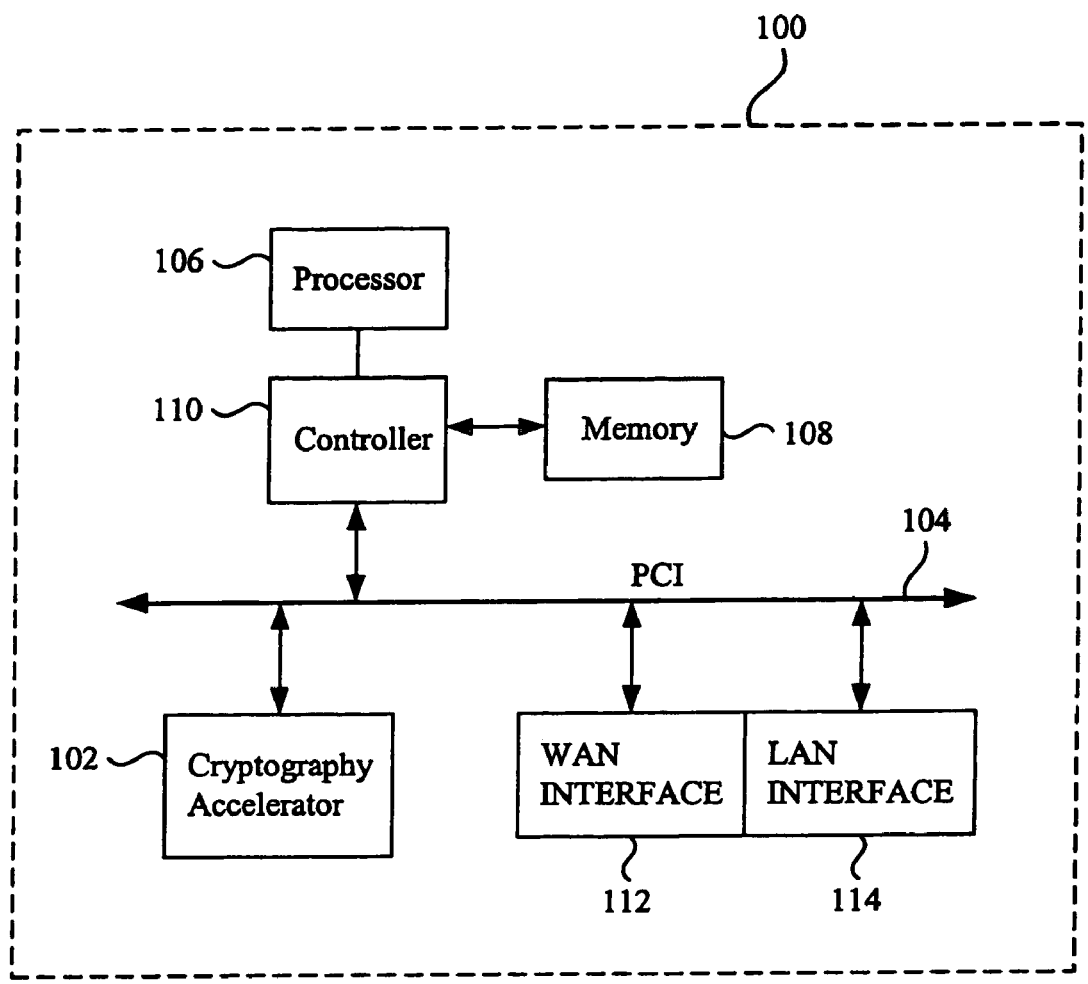
FIG. 1 is a diagrammatic representation of a system that can use the techniques of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Techniques are provided for enabling the implementation of efficient cryptographic processing, such as DES and triple DES processing. DES specifies encrypting individual 64-bit data blocks. A 64-bit data block of unencrypted data is provided to the DES engine, combined with a key and an initial vector, and output as a 64-bit data block of encrypted data. The key used for DES processing is typically a 56-bit number, although the key can be expressed as a 64-bit number. DES describes breaking up a 64-bit block of data into a right half and a left half, each 32-bits long. As will be appreciated by one of skill in the art, sixteen rounds of cryptographic operations are then performed. In each round, operations on the right half of the data include expansion, permutation, Sbox operations, and combination with a round key. A round key can be determined based on the round number of DES processing is referred to herein as a round key. The round key can be derived by applying permutation and shift functions to all 56 bits of the original key. The round number of DES determines the shift amount.

An XOR function is used to combine the right half of the data with a version of the key based on the round. The result can then be combined with the left half also by way of an XOR function. The unprocessed right half of the data becomes the left half of the data for the next round. Triple DES specifies performing three 16 round DES operations consecutively using three different keys. Typical hardware implementations for DES or triple DES perform one round calculation per clock cycle. The performance of DES or triple DES engines is therefore related to the clock rate. However, a variety of hardware design constraints have traditionally limited the clock rate of cryptographic processing engines.

One design constraint that has traditionally limited the clock rate of cryptographic processing engines is the clock rate of circuitry surrounding the cryptographic processing unit. Surrounding logic typically has a slower clock rate than the DES engine. Methods and apparatus are described for providing a synchronizer to bridge the clock rate differences between the DES engine and the surrounding logic. The bridged DES engine and surrounding logic allow flexibility in setting different clock ratios. The flexibility allows the DES engine to be designed to operate at a much higher clock rate than the surrounding logic.

Other design constraints relate to Sbox processing. As noted above, expansion logic takes a 32-bit block, moves and replicates certain bits, and outputs a 48-bit block. Each Sbox associated with Sbox logic takes a six bit portion of the 48-bit block and maps the six bits to a four bit block. The expansion logic, however, is not able to provide all bits of the 48-bit block at the same time. In one example, replication of certain bits takes time and expansion logic can provide nonduplicated bits before it can provide duplicated bits. Each individual Sbox, however, typically waits for a complete six bit block before processing the block to output a four bit block. To optimize Sbox processing, the techniques of the present invention enables the processing of nonduplicated bits first. In other words, bits from expansion logic can be processed as soon as they become available. In one embodiment, bits three and four in each six bit sequence are processed as the nonduplicated bits by an Sbox before the duplicated bits one, two, five, and six.

Each Sbox can have a variety of components. Multiplexers can be used to determine what it to select based upon an input control line. In one embodiment, the techniques of the present invention contemplates using a table lookup component to process the nonduplicated bits from expansion logic. A table lookup component can be implemented more efficiently than a multiplexer. The Sbox can use the nonduplicated bits and the table lookup component to begin the process of mapping the six bit input to a four bit output. The Sbox can then use the duplicated bits to complete the process of mapping.

The techniques of the present invention can be implemented in a variety of contexts. FIG. 1 describes the present invention in terms of a cryptographic accelerator system that can be implemented in a number of ways, such as for example, as a stand alone integrated circuit, as embedded software, or as a subsystem included in, for example, a server computer used in a variety of Internet and Internet related activities. It should be noted, however, that the invention is not limited to the described embodiments and can be used in any system where data encryption is desired.

FIG. 1 is a diagrammatic representation of one example of a cryptographic processing system 100 in accordance with an embodiment of the invention. As shown in FIG. 1, the present invention may be implemented in a stand-alone cryptography accelerator 102 or as part of the system 100. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110. Although the processing unit 106 may be the central processing unit or CPU of a system 100, it does not necessarily have to be the CPU. It can be one of a variety of processors in a multiprocessor system, for example. A LAN interface 114 can couple the processing system 100 to a local area network (LAN) to receive packets for processing and transmit processed packets. Likewise, a Wide Area Network (WAN) interface 112 connects the processing system to a WAN (not shown) such as the Internet and manages in-bound and out-bound packets, providing automatic security processing for IP packets.

A cryptography accelerator 102 can perform many cryptography algorithms including the DES and the triple DES algorithms. It should be noted that although the techniques of the present invention will be described in the context of DES and triple DES for clarity, one of skill in the art will appreciate that the techniques can also apply to other cryptography algorithms including variations to the DES and triple DES algorithms.

Figure 2:
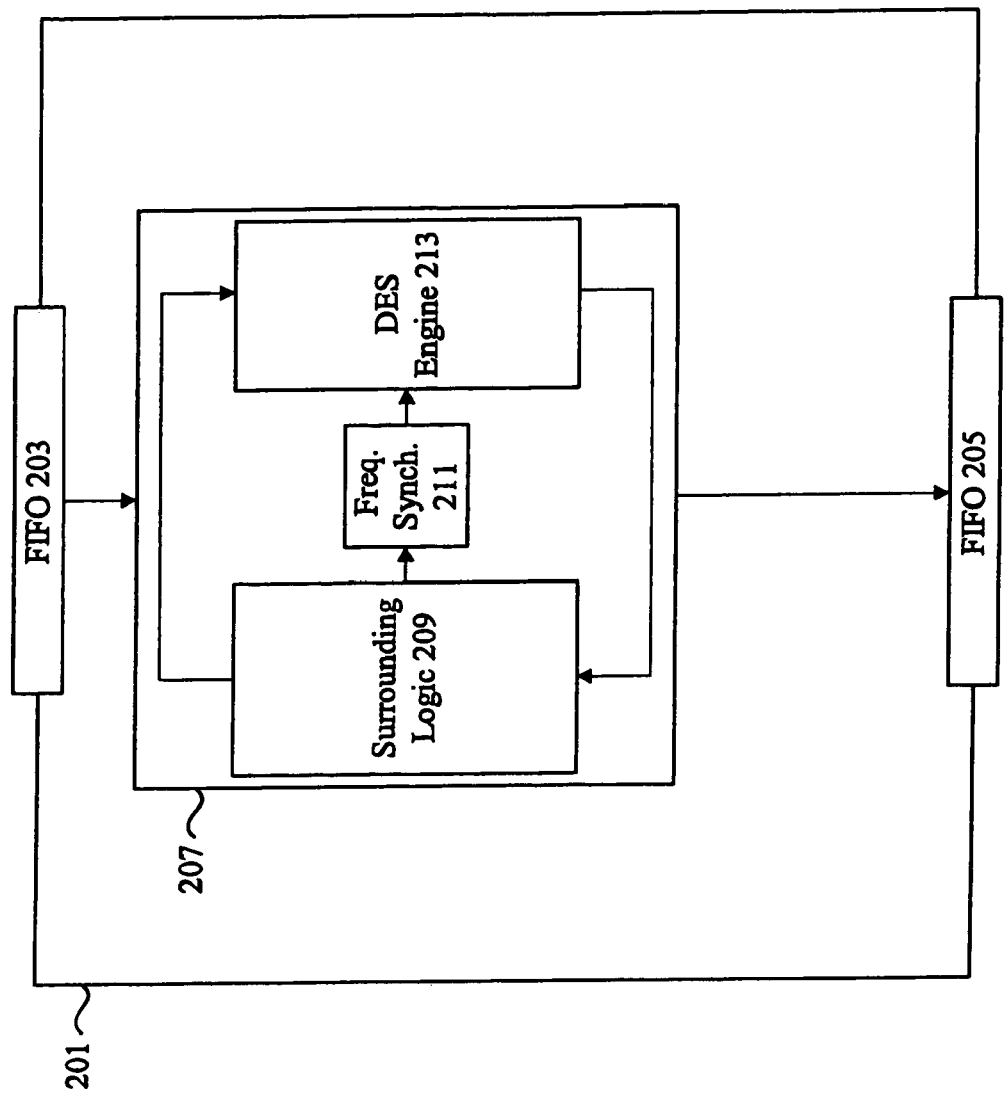
FIG. 2 is a diagrammatic representation of a cryptography engine having a frequency synchronizer, surrounding logic, and a DES engine.

FIG. 2 is a diagrammatic representation of a cryptographic processing unit in accordance with one embodiment of the present invention. The cryptographic processing unit 201 has input and output buffers 203 and 205. The input and output buffers 203 and 205 may be coupled to an external processor as shown in FIG. 1. The cryptographic processing unit 201 contains a cryptography engine 207. The cryptographic processing unit 201 can also contain an authentication engine. As will be appreciated by one of skill in the art, other components including decoding logic may also be components in the cryptographic processing unit 201. The cryptography engine 207 contains surrounding logic 209 and DES engine 213. The DES engine 213 is coupled with the surrounding logic 209. However, the DES engine 213 may operate at a much higher clock rate than the surrounding logic 209. A frequency synchronizer 211 coupled to both the DES engine 213 and the surrounding logic 209 can manage data transmissions between DES engine 213 and surrounding logic 209. The frequency synchronizer can coordinate data transmissions to the DES engine 213 to indicate when processing in the DES engine 213 should begin and notify surrounding logic 209 when data should be read from DES engine 213.

The surrounding logic 209 can parse the data to allow processing of portions of the data by the DES engine 213. The DES engine 213 can process a data block whenever a frequency synchronizer 211 sends a start signal. The frequency synchronizer 211 can compensate for the rate mismatch between the surrounding logic 209 and the DES engine 213. The frequency synchronizer 211 provides flexibility for setting different clock ratios between DES engine 213 and surrounding logic 209 and allows reuse of the same DES engine 213 design in other processor configurations. In one example, the clock ratio between the DES engine 213 and the surrounding logic 209 is 3 to 1. In this example, the DES engine can operate at about 300 MHz while the surrounding logic can operate at about 100 MHz.

While this embodiment of the invention is described with respect to a DES engine, the invention may be applied more generally to other cryptography engines such as AES.

Figure 3:
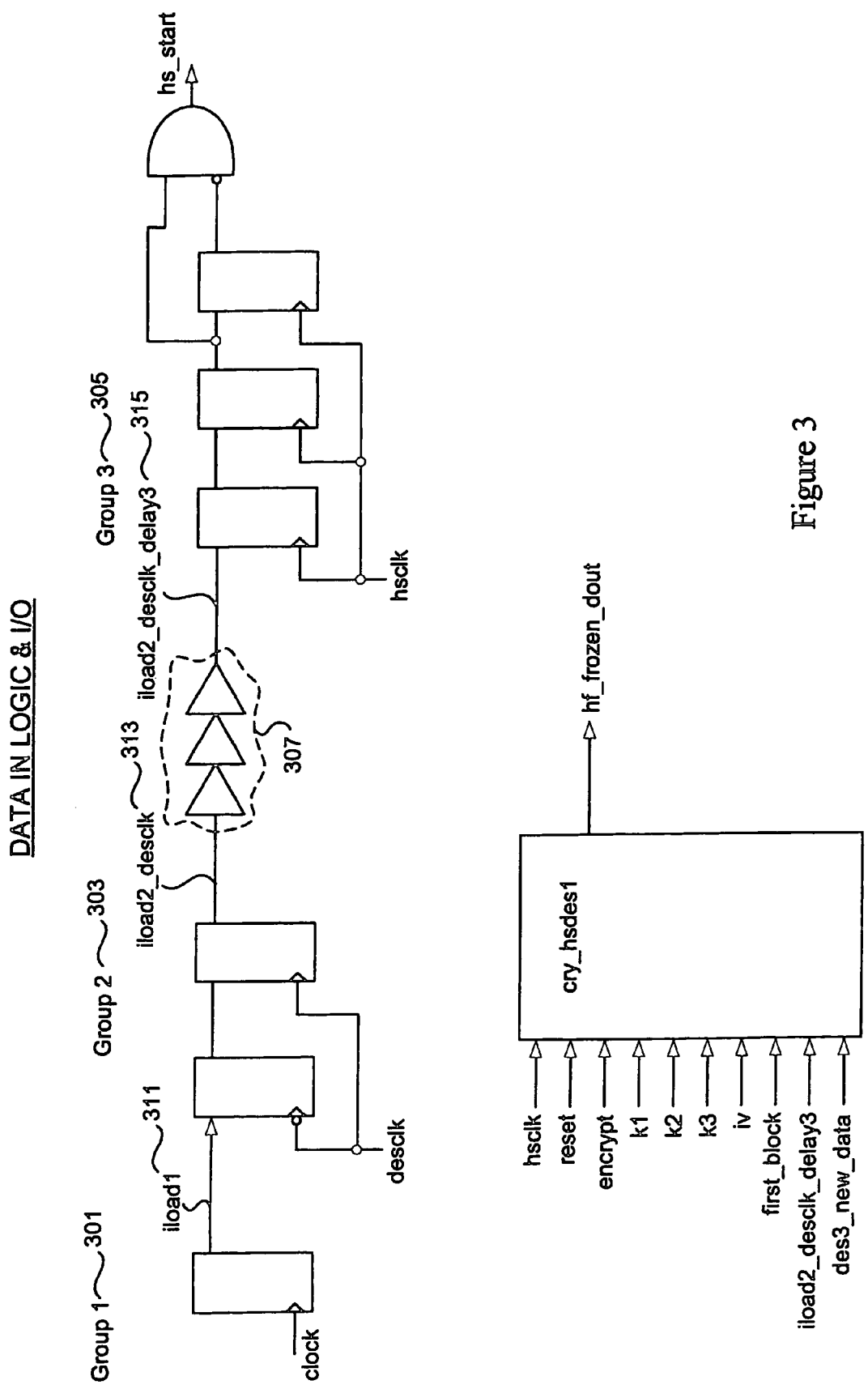
FIG. 3 is a diagrammatic representation of DES engine start logic.

FIG. 3 is a diagrammatic representation of logic for synchronizing the DES engine 213 and the surrounding logic 209. The logic can be implemented in a frequency synchronizer 211. FIG. 3 will be described with reference to the timing diagram shown in FIG. 4. In the cryptography engine 207, the DES engine 213 can be operated at a high clock rate in relation to surrounding logic 209 in order to optimize cryptography processing. In one embodiment, the DES engine operates at 300 MHz while the surrounding logic operates at 100 MHz. In various embodiments, the surrounding logic can also be operated at 300 MHz to build a fully synchronous cryptography engine. However, operating the surrounding logic at 300 MHz uses more on chip resources that can be used to improve the speed of the DES engine. To allow surrounding logic operating at a slower clock frequency to interact with a DES engine operating at a higher clock frequency, several mechanisms can be used. One mechanism is the use of asynchronous FIFOs. Asynchronous FIFOs are described in related U.S. patent application Ser. Nos. 09/892,240, 09/892,310, 09/892,242 all entitled "Methods And Apparatus For Implementing A Cryptography Engine," as of their filing date on Jun. 26, 2001, the entireties of which are herein incorporated by reference for all purposes.

Another mechanism to allow operation of surrounding logic clocked at a slower frequency and a DES engine clocked at a higher frequency is to use a frequency synchronizer. One problem associated with running a DES engine at a higher clock frequency than surrounding logic relates to skew. It should be noted that other problems such as jitter are also contemplated. Skew refers to the timing difference between design and actual elements. Skew can result from differences in signal paths and can reach a full nanosecond. Jitter may result from indeterministic variations in clock periods. In one example, a 100 MHz clock may not have a period of exactly 10 ns during every cycle. It may have a period of 10.005 ns in one cycle and 9.5 ns in another cycle.

Surrounding logic may expect that the DES engine will read a signal every 10 ns. Consequently, surrounding logic may provide a signal such as a start signal to begin DES processing when this 10 ns interval occurs. However, the high-speed clock associated with the DES engine may have skew associated with it. In one example, the DES engine will read a start signal when this 10 ns interval arrives. However, due to skew, the DES engine may attempt to read a start signal after 9.995 ns. In other words, the DES engine may attempt to read a start signal before the start signal is available from the surrounding logic. Skew may cause the DES engine to miss the start signal.

Figure 4:
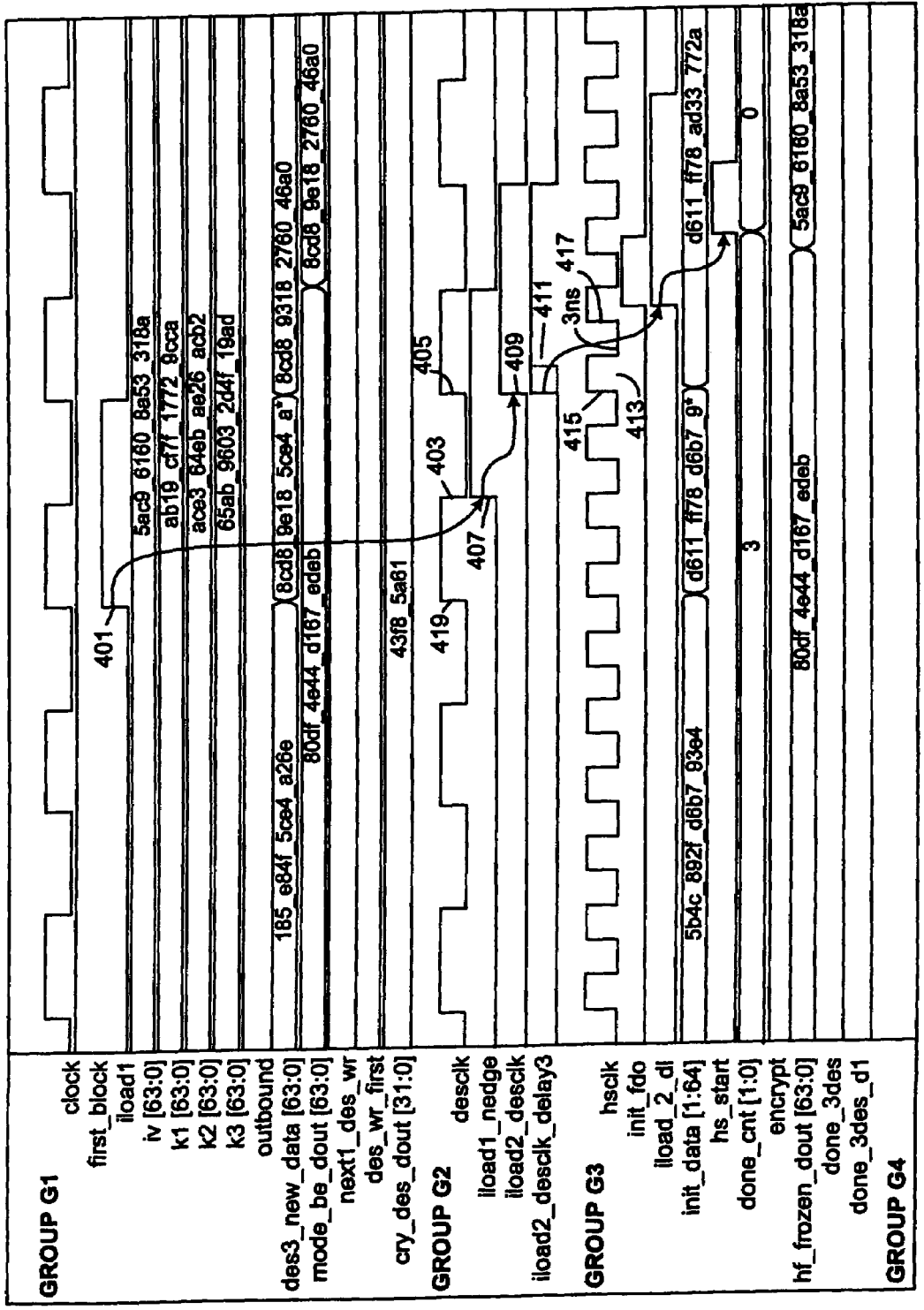
FIG. 4 is a graphical representation of a timing diagram depicting the clock synchronization for reading data from the surrounding logic.

In the example where the DES engine operates at three times the clock rate of the surrounding logic, frequency synchronization logic shown in FIG. 3 having timing characteristics shown in FIG. 4 can be used. Group G1 301 provides a signal iload1 to Group G2 303 at 401. The signal iload1 311 is read upon the occurrence of a negative edge 403 of a 1× clock. The negative edge 403 of the 1× clock instead of the rising edge 419 of the 1× clock is used so that the iload1 signal will not be missed because of skew. The signal is then read again using rising edge 405 to provide iload2_desclk 313. A delay element 307 is then introduced so that the iload2_desclk 313 signal will not be read at 3× clock leading edge 415 but instead at 3× clock leading edge 417. Various delays are contemplated. The delay amount can factor in the clock frequency of the DES engine, the clock frequency of the surrounding logic, and the amount of expected skew. The amount of delay can vary from a fraction of a nanosecond to several nanoseconds. In one embodiment where the 3× clock is 300 MHz and the 1× clock is 100 MHz, the amount of delay is 1.5 ns. Using the delay element 307, group G3 305 reads the start signal at rising edge 417 and provides the start signal to the DES engine.

The DES engine can then perform DES processing. It should be noted that the surrounding logic will be able to anticipate the number of clock cycles needed to complete DES processing. As will be appreciated by one of skill in the art, a typical implementation of DES uses a predetermined number of clock cycles. The surrounding logic can then read data from the DES engine after the predetermined number of clock cycles has elapsed.

Figure 5:
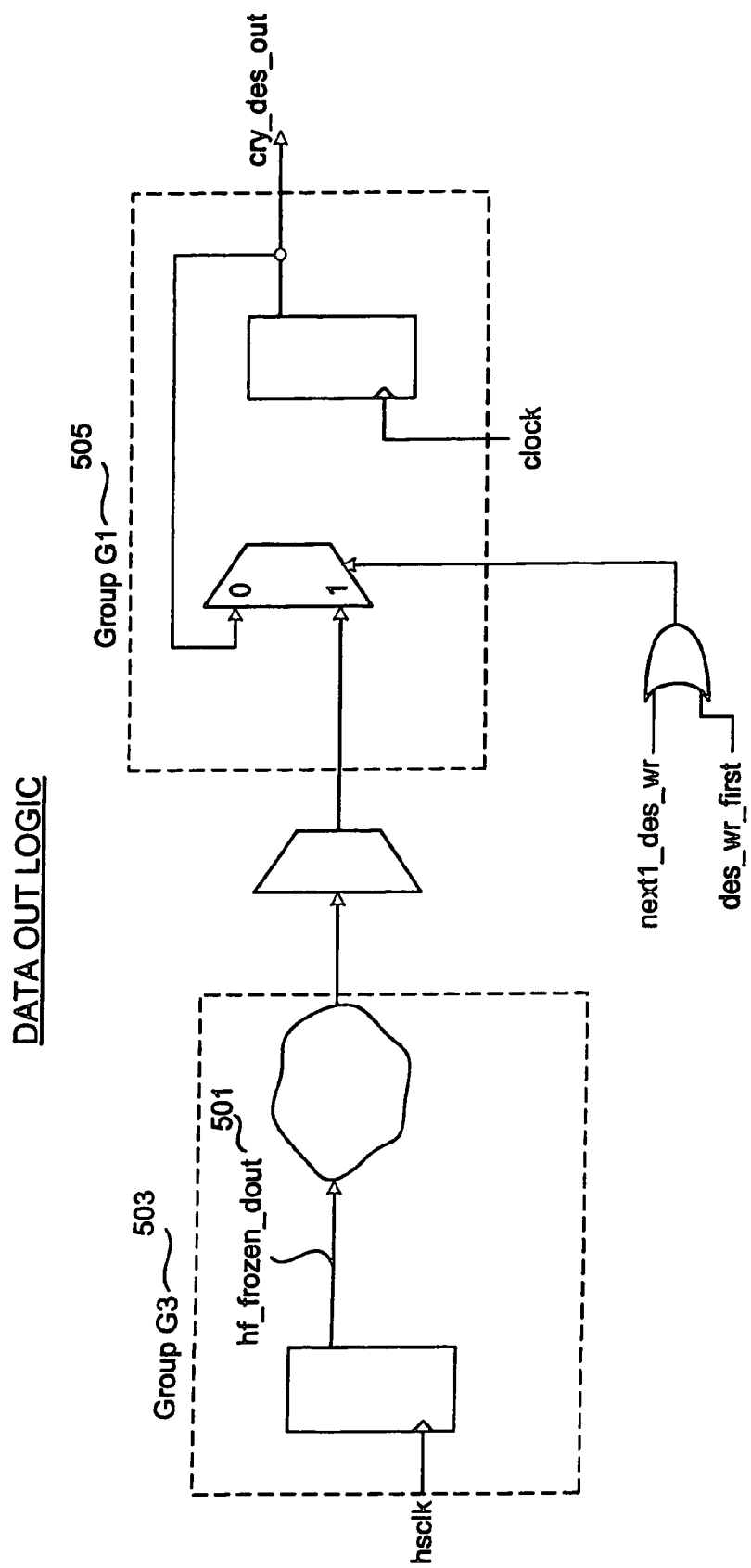
FIG. 5 is a diagrammatic representation of DES engine output logic.
Figure 6:
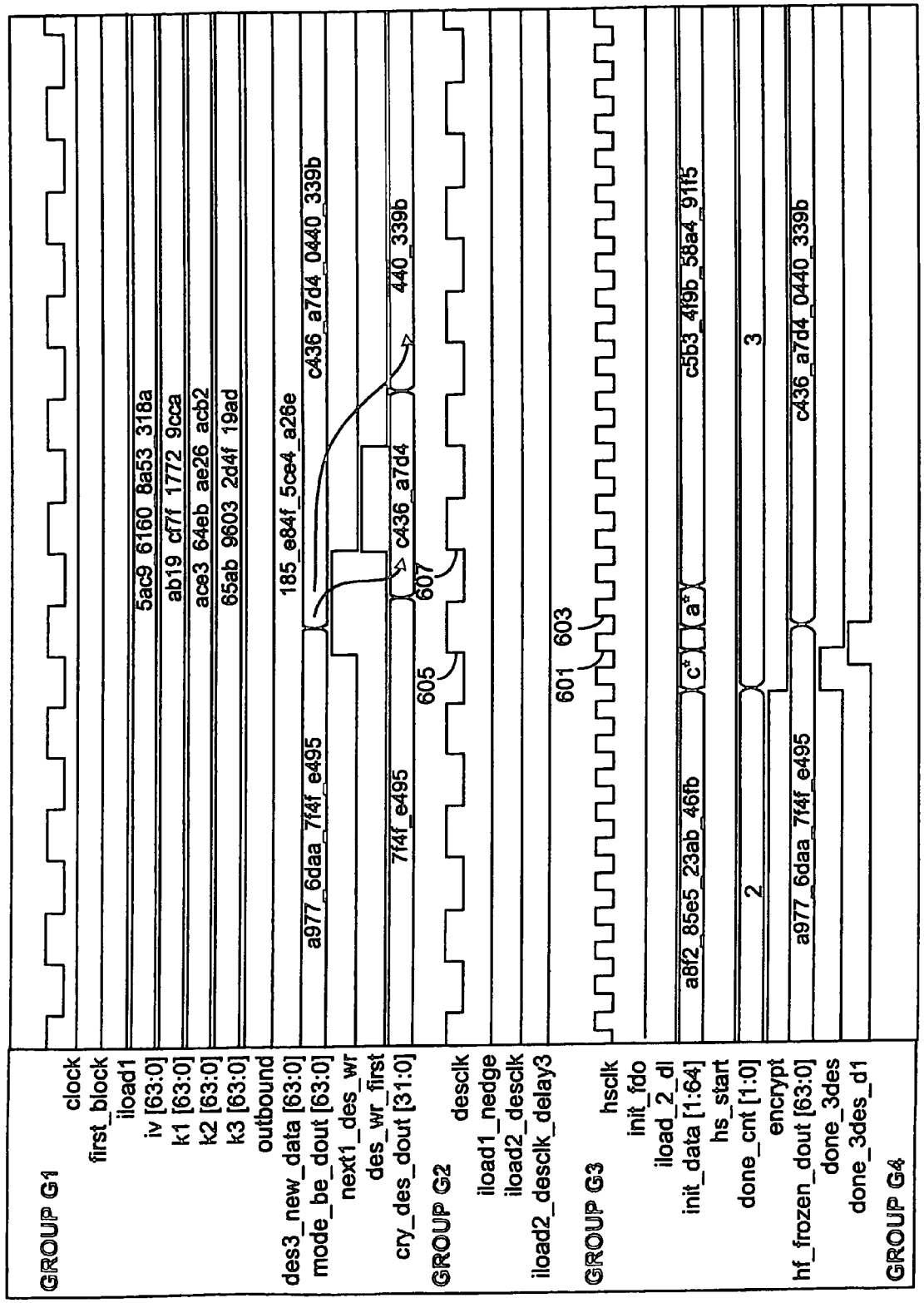
FIG. 6 is a graphical representation of a timing diagram depicting the clock synchronization for reading data from the DES engine.

FIG. 5 is a diagrammatic representation of data out logic and will be described with reference to the timing diagram shown in FIG. 6. In one embodiment shown in FIGS. 5 and 6, the surrounding logic waits one clock cycle of the high speed clock before reading the data from the DES engine. Group G3 503 provides a signal hf_frozen_dout 501 to Group G1 505. Group G1 505 reads the signal not on the 1× clock rising edge 605 corresponding to rising edge 601 of the 3× clock but on the second rising edge 603 of the 3× clock. By waiting one clock cycle, the risk of missing the signal due to skew can be reduced.

As will be appreciated by one of skill the art, a variety of components such as registers, flip-flops, and delay elements can be used to implement a frequency synchronizer. Furthermore, it will be appreciated that the frequency synchronizer can be associated with edge triggering, level triggering, or other triggering mechanisms.

Figure 7:
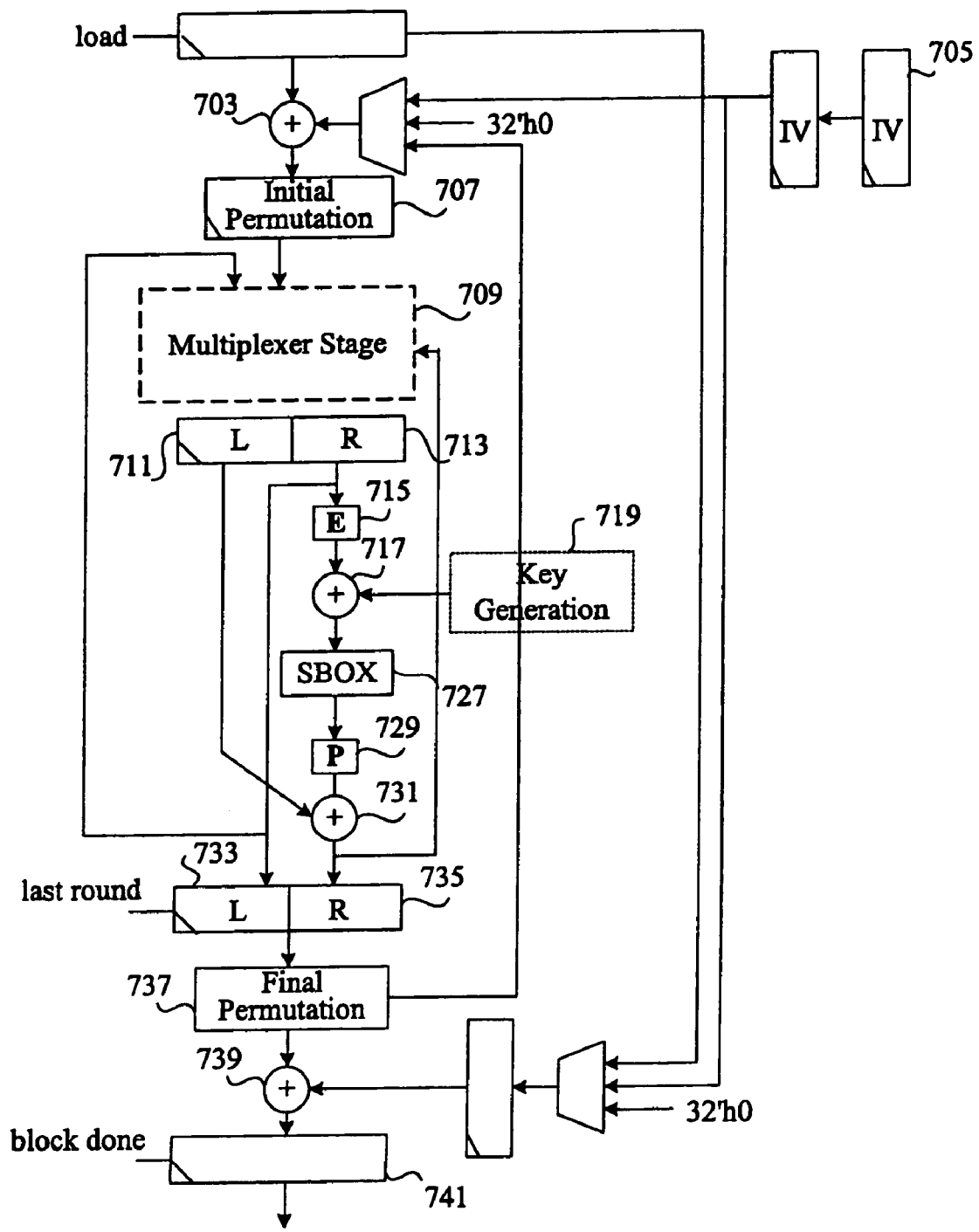
FIG. 7 is diagrammatic representation of a DES engine in accordance with one embodiment of the present invention.

FIG. 7 is a diagrammatic representation of a DES engine 213 as shown in FIG. 2. The DES engine can be coupled to a frequency synchronizer 211 to allow the DES engine 213 to operate at a different clock rate than surrounding logic. According to various embodiments, a 64-bit data block is combined with an initialization vector from initialization vector block 705. Initialization vectors (IV) are described in RFC 2405 titled The ESP DES-CBC Cipher Algorithm With Explicit IV, the entirety of which is incorporated by reference for all purposes. The 64-bit block then undergoes an initial permutation at 707. The initial permutation occurs before round 1. It should be noted that in some variations to DES, to which the present invention is applicable, initial permutation and final permutation operations are not performed. The 64-bit block can then be passed to a multiplexer stage 709.

The multiplexer stage 709 contains logic for determining whether to load initial data, swap data from the previous round, or not swap data from the previous round. In one embodiment, the multiplexer uses a 3-to-1 multiplexer to select either the initial data, the swapped feedback data, or the non-swapped feedback data. Initial data is loaded in the first round of DES processing. Data is swapped between rounds of DES processing. Data is not swapped in triple DES between the completed 16 rounds of DES processing. Control logic (not shown) can track the round number in order to determine what signals to send to the multiplexers.

Registers 711 and 713 receive the initial data or the feedback data. It should be noted that the registers referenced in FIG. 7 can be clocked at a high speed clock rate different than that of surrounding logic. Register 711 contains the last half of this initial 64-bit block in round 1. Register 713 contains the right half of the 64-bit block in round 1. Registers 711 and 713 both typically hold 32-bits of data. The 32-bit data block contained in register 713 is provided to both expansion stage 715 and to register 711 through multiplexer stage 709 for the next round. Control signals in multiplexer stage 709 are configured to provide the 32-bit data block contained in register 713 to register 711 in the next round of DES processing. The 32-bit data block is provided to expansion logic 715.

As will be appreciated by one of skill in the art, the expansion logic 715 changes the order of the bits in the 32-bit at block and also repeats certain bits. The expansion logic 715 uses the 32-bit block to generate a 48-bit block. The expansion logic improves the effectiveness of the encryption process and also makes the 32-bit block into a 48-bit block that corresponds to the size of the key. The 48-bit block can then be combined with an XOR with the 48-bit round key at 717.

Keys are provided by key generation logic or key scheduler circuitry 719. A version of the key for cryptography processing of the original 64-bit block is provided by key scheduler 719. Key scheduler 719 can provide a different version of the original key for every round by applying permutation and shift functions to all 56 bits of the original key. The 48-bit block resulting from the XOR at 717 is provided to Sbox stage 727. As will be appreciated by one of skill the art, each Sbox in Sbox stage 727 converts a six-bit input into a four-bit output. According to various embodiments eight Sboxes are provided in Sbox stage 727. Sboxes, expansion logic, and other cryptography operations are described in Applied Cryptography, Bruce Schneier (ISBN 0471128457), the entirety of which is incorporated by reference for all purposes.

The 32-bit output of Sbox stage 727 is provided to permutation stage 729. A permutation stage 729 maps input bits in certain positions to different output positions. In one example, bit 1 is moved to position 16 of the output, bit 2 is moved to position 7 of the output, and bit 3 is moved to position 20 of the output, etc. The 32-bit output of permutation stage 729 is combined with an XOR with the value in register 711 at 731. The result of the XOR is provided to the register 711 through multiplexer stage 709 for the next round of DES processing. The same process occurs for the subsequent rounds of DES processing. That is, the right half is expanded, combined with an XOR function with a version of the key, provided to an Sbox stage, permuted, and combined with an XOR with the left half. After the last round, the outputs are written to register 733 and register 735. The output can then undergo a final permutation at 737. The result of a final permutation at 737 is combined by way of an XOR with an initialization vector as noted above when the DES engine is used to decrypt data. Otherwise, the result of the final permutation at 737 can remain unchanged by combining by way of an XOR with a sequence of zeros.

For triple DES, the outputs at 733 and 735 are passed back to multiplexer stage 709. Control circuitry determines how to pass the data back to register 711 and 713 for a next 16 rounds of DES processing. The processed data resulting from the DES or triple DES algorithm is provided to output register 741.

Figure 8:
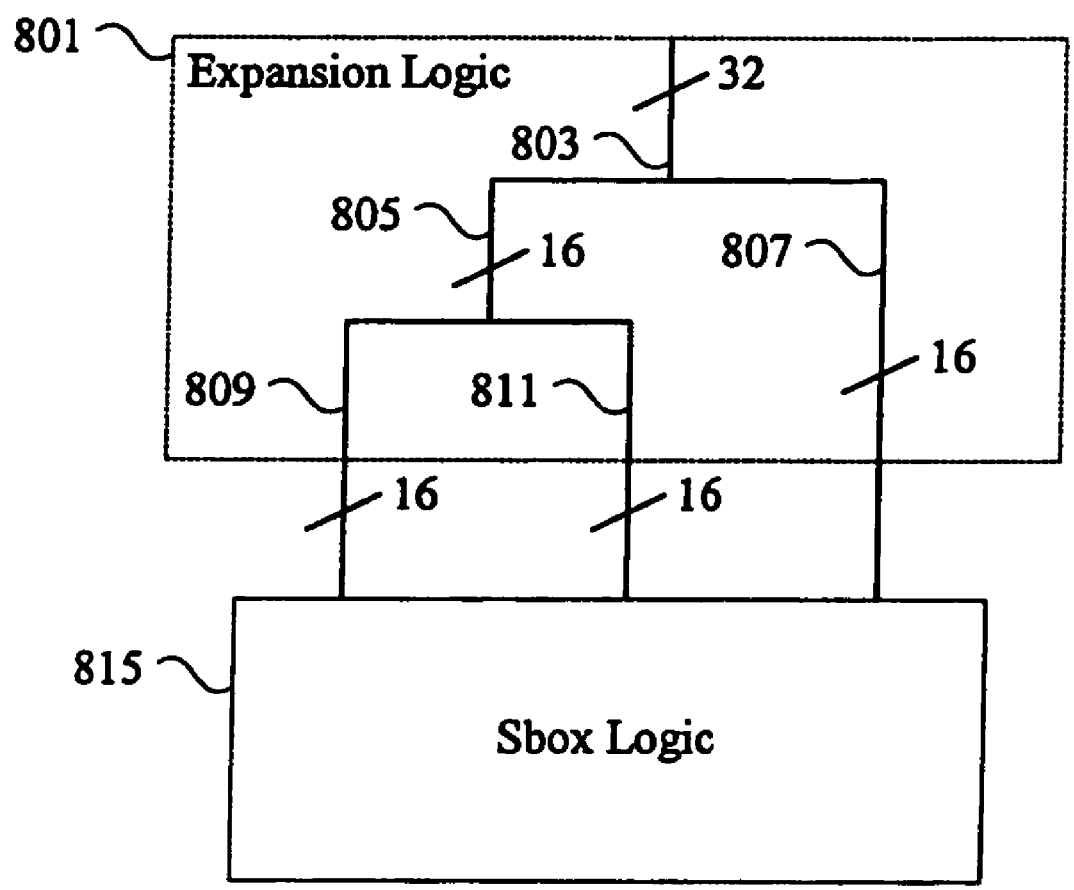
FIG. 8 is a diagrammatic representation of expansion logic providing data to an Sbox.

FIG. 8 is a diagrammatic representation of expansion logic 801 coupled to Sbox logic 815. As will be appreciated by one of skill in the art, expansion logic rearranges and duplicates bits in a 32-bit block to output a 48-bit data block. The 48-bit data block can then be XORed with a round key and provided to Sbox logic 815. The 32-bit data block along path 803 is divided into a 16-bit data block along path 807 and a 16-bit data block along path 805. The 16-bit data block along path 805 is duplicated and provided along data paths 811 and 809 as 16-bit data blocks. However, the bit duplication process takes time. Consequently, the 16-bit data blocks on paths 811 and 809 are generated after the 16-bit data block on path 807 is output to Sbox logic 815.

In conventional implementations, the Sbox logic 815 waits for the entire 48-bit data block from the expansion logic 801 before proceeding with Sbox processing. However, waiting for the entire 48-bit bit data block does not benefit from the fact that the 16-bit data block along path 807 can be provided at a slightly earlier time. By beginning processing of the 16-bit data block 807 before processing the 16-bit data blocks on path is 811 and 809, Sbox logic can be optimized to process data as soon as it is available. Generally, the data block that is most quickly output from expansion logic 801 is referred to herein as the nonduplicated block or nonduplicated bits. A less quickly output data block, typically delayed because of replication logic, is referred to herein as a duplicated block or duplicated bits. According to various embodiments, the 16-bit data block on path 807 has nonduplicated bits while the 16-bit data blocks provided on paths 811 and 809 has duplicated bits.

It should be noted that duplicated and nonduplicated bits can be provided to each individual Sbox as well. As will be appreciated by one of skill in the art, Sbox logic 815 is commonly implemented using eight separate individual Sboxes. Each individual Sbox receives a six-bit input and maps the six-bit input to the corresponding four-bit output. The expansion logic provides each Sbox with a six-bit input. Expansion logic rearranges and duplicates bits in a four-bit data block to output a six-bit data block. The six-bit data block can then be XORed with a key and provided to Sbox logic 815.

Figure 9:
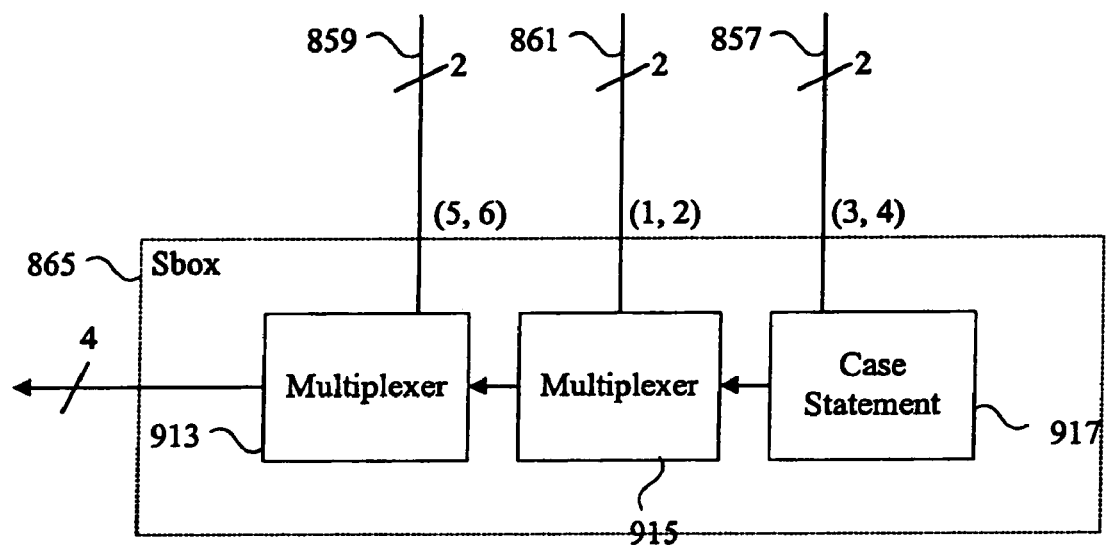
FIG. 9 is a diagrammatic representation of expansion logic providing data to an Sbox having a plurality of stages.

FIG. 9 is a diagrammatic representation showing expansion logic providing data to Sbox logic having multiple components. Sbox logic can be implemented using a variety of components. As noted above, and Sbox maps a six-bit input to a four-bit output. In other words, and Sbox can map a value ranging from 000000 to 111111 to a value ranging form 0000 to 1111. In one implementation, a table with the 64 entries ranging from 000000 to 111111 can be referenced in order to determine the four-bit output ranging from 0000 to 1111. The six-bit input can be referenced to the 64 entries to locate the corresponding four-bit entry. However, referencing a large table using six bits can be inefficient. Furthermore, referencing a 64 entry table using a six-bit input does not benefit from the nonduplicated bits being provided more quickly to the Sbox logic 865.

According to various embodiments, the Sbox 865 uses nonduplicated bits from expansion logic when they become available. A table lookup component 917 can use the nonduplicated bits provided on path 857 to narrow the 64 possible bit values to 16 possible bit values. In one example, bits three and four are the nonduplicated bits on path 857. Depending on whether bits three and four correspond to (0, 0), (0, 1), (1, 0), or (1, 1), 16 possible bit values are provided to multiplexer stage 915. Code for implementing the mapping of six bit values on to four bit values using Sbox components is provided in Table 1 below. After a table lookup component 917 has narrowed the possible values from 64 to 16 using bits three and four, the 16 possible values are provided to multiplexer stage 915. According to various embodiments, the component 917 can be referred to herein as a first stage. The first stage can be a component such as a table lookup component, a case statement, or a multiplexer. The first stage 917 can pass data to a second stage 915 that may comprise a multiplexer. The multiplexer stage 915 uses duplicated bits, such as bits one and two or bits five and six to narrow the 16 possible values to four possible values depending on whether the duplicated bits correspond to (0, 0), (0, 1), (1, 0), or (1, 1). Before possible values are provided to multiplexer stage 913 which outputs a single four bit values based on duplicated bits provided on path 859. It should be noted that multiplexer stage 913 can be referred to herein as a third stage.

It should be noted in various embodiments, multiplexer stage 913 cannot process bits on path 859 until provided information from multiplexer stage 915. A multiplexer stage 915 similarly cannot process bits on path 861 until provided information from table lookup stage 917. Consequently, table lookup stage 917 is associated with the critical path of Sbox 865. A multiplexer stage is 913 and 915 can only process after table lookup component 917 has completed processing. The multiplexer stages 913 and 915 can be referred to as less critical paths in Sbox 865. It is beneficial to allow table lookup component 917 to begin operations as soon as possible, as multiplexer stages 915 and 913 can not perform processing until table lookup component 917 is finished. One way of allowing the table lookup component 917 to begin operations quickly is to provide nonduplicated bits from expansion logic 851. As noted above, nonduplicated bits can be provided from expansion logic 851 before duplicated bits.

According to other embodiments, table lookup component 917 can be implemented as a multiplexer stage. However, by using a table lookup component 917 instead of a multiplexer stage, the processing of the bits on path 857 can be performed more efficiently. A multiplexer stage 913 uses inputs from path 859 and from multiplexer 915. A multiplexer stage 915 uses inputs from path 861 and from component 917. According to various embodiments, component 917 can provide outputs using input only from path 857. Thus, a table lookup component can be used instead of a multiplexer at 917.

Figure 10:
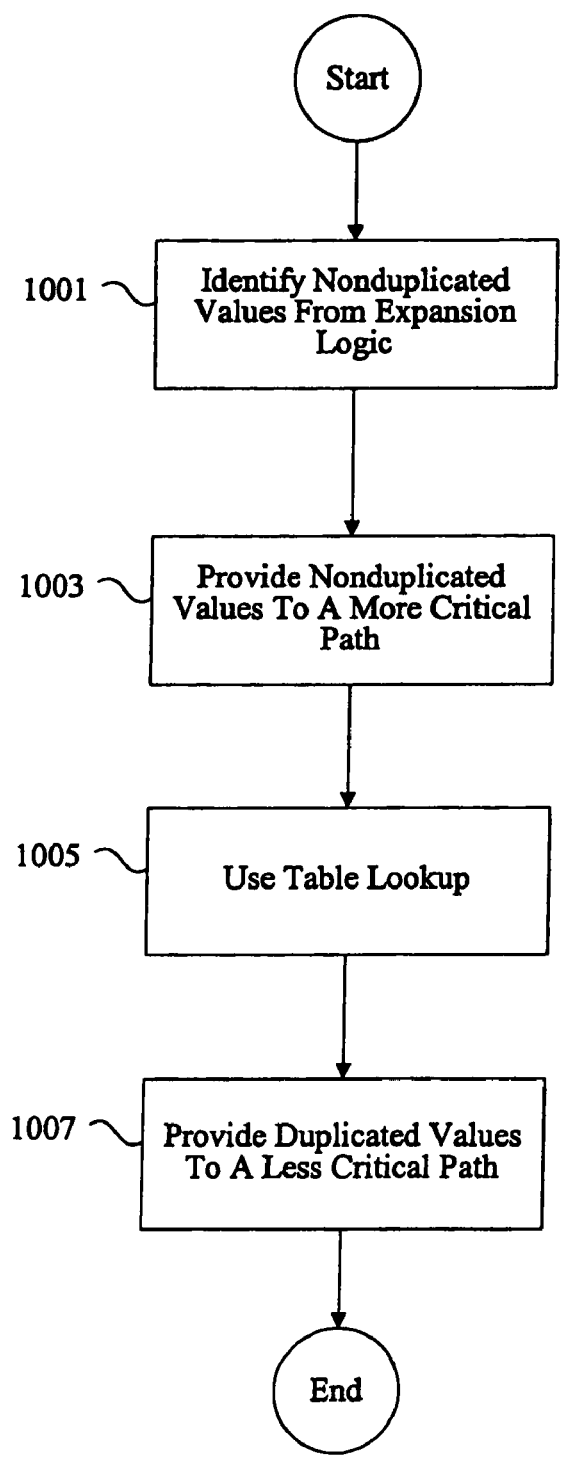
FIG. 10 is a process flow diagram showing the expansion logic providing bits to the Sbox logic.

FIG. 10 is a process flow diagram showing the interaction of expansion logic and Sbox logic. At 1001, nonduplicated values from expansion logic are identified. The nonduplicated values are typically bits three and four in a six bit block provided from expansion logic to a single Sbox. At 1003, the nonduplicated values are provided to the most critical path of the Sbox. According to various embodiments, the most critical path is the table lookup component the provides input to a subsequent multiplexer stage as shown in FIG. 9. At 1005, a table lookup component can be used to process bits in the most critical path. At 1007, the duplicated values or delayed values are provided to bless critical path of the Sbox. The duplicated values may be provided in two bit blocks to separate multiplexer stages or another example, the duplicated values may be provided as a four bit block to another table lookup component. As will be appreciated by one of skill in the art, a variety of different components can be used in a critical paths of an Sbox. For example, a variety of 2 to 1, 3 to 1, and 4 to 1 multiplexers can be used along with table lookup components.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of encryption algorithms and should not be restricted to the ones mentioned above. Therefore, the scope of the invention should be determined with reference to the appended claims.

TABLE 1

Sbox Implementation Source Code

```
module cry_hs_sbox1 (key_data, right_data, sbox1);
input    [1:6]  key_data;
input    [1:6]  right_data;
output   [1:4]  sbox1;
/******************************************************/
wire     [1:6]  sbox1_sel;
reg      [1:4]  sbox1a, sbox1b, sbox1c, sbox1d, sbox1e, sbox1f,
                sbox1g, sbox1h;
reg      [1:4]  sbox1i, sbox1j, sbox1k, sbox1l, sbox1m, sbox1n,
                sbox1o, sbox1p;
wire     [1:4]  sbox1w, sbox1x, sbox1y, sbox1z;
wire     [1:4]  sbox1;
/******************************************************/
assign sbox1_sel = key_data ^ right_data;
/***************/
always @(sbox1_sel)
   begin
   // case ({chunk[3:4, 1:2, 5:6]})
      case (sbox1_sel[3:4]) // synopsys full_case parallel_case
         2'b00 /*00 00*/ : sbox1a[1:4]=4'd14;
         2'b01 /*00 00*/ : sbox1a[1:4]=4'd13;
         2'b10 /*00 00*/ : sbox1a[1:4]=4'd2;
         2'b11 /*00 00*/ : sbox1a[1:4]=4'd11;
      endcase
      case (sbox1_sel[3:4]) // synopsys full_case parallel_case
         2'b00 /*01 00*/ : sbox1b[1:4]=4'd3;
         2'b01 /*01 00*/ : sbox1b[1:4]=4'd6;
         2'b10 /*01 00*/ : sbox1b[1:4]=4'd5;
         2'b11 /*01 00*/ : sbox1b[1:4]=4'd0;
      endcase
      case (sbox1_sel[3:4]) // synopsys full_case parallel_case
         2'b00 /*10 00*/ : sbox1c[1:4]=4'd4;
         2'b01 /*10 00*/ : sbox1c[1:4]=4'd14;
         2'b10 /*10 00*/ : sbox1c[1:4]=4'd13;
         2'b11 /*10 00*/ : sbox1c[1:4]=4'd2;
      endcase
      case (sbox1_sel[3:4]) // synopsys full_case parallel_case
         2'b00 /*11 00*/ : sbox1d[1:4]=4'd15;
         2'b01 /*11 00*/ : sbox1d[1:4]=4'd9;
         2'b10 /*11 00*/ : sbox1d[1:4]=4'd3;
         2'b11 /*11 00*/ : sbox1d[1:4]=4'd5;
      endcase
      case (sbox1_sel[3:4]) // synopsys full_case parallel_case
         2'b00 /*00 01*/ : sbox1e[1:4]=4'd0;
         2'b01 /*00 01*/ : sbox1e[1:4]=4'd7;
         2'b10 /*00 01*/ : sbox1e[1:4]=4'd14;
         2'b11 /*00 01*/ : sbox1e[1:4]=4'd13;
```

TABLE 1-continued

Sbox Implementation Source Code

```
      endcase
      case (sbox1_sel[3:4]) // synopsys full_case parallel_case
         2'b00 /*01 01*/ : sbox1f[1:4]=4'd10;
         2'b01 /*01 01*/ : sbox1f[1:4]=4'd12;
         2'b10 /*01 01*/ : sbox1f[1:4]=4'd9;
         2'b11 /*01 01*/ : sbox1f[1:4]=4'd3;
      endcase
      case (sbox1_sel[3:4]) // synopsys full_case parallel_case
         2'b00 /*10 01*/ : sbox1g[1:4]=4'd15;
         2'b01 /*10 01*/ : sbox1g[1:4]=4'd8;
         2'b10 /*10 01*/ : sbox1g[1:4]=4'd4;
         2'b11 /*10 01*/ : sbox1g[1:4]=4'd1;
      endcase
      case (sbox1_sel[3:4]) // synopsys full_case parallel_case
         2'b00 /*11 01*/ : sbox1h[1:4]=4'd5;
         2'b01 /*11 01*/ : sbox1h[1:4]=4'd3;
         2'b10 /*11 01*/ : sbox1h[1:4]=4'd10;
         2'b11 /*11 01*/ : sbox1h[1:4]=4'd6;
      endcase
      case (sbox1_sel[3:4]) // synopsys full_case parallel_case
         2'b00 /*00 10*/ : sbox1i[1:4]=4'd4;
         2'b01 /*00 10*/ : sbox1i[1:4]=4'd1;
         2'b10 /*00 10*/ : sbox1i[1:4]=4'd15;
         2'b11 /*00 10*/ : sbox1i[1:4]=4'd8;
      endcase
      case (sbox1_sel[3:4]) // synopsys full_case parallel_case
         2'b00 /*01 10*/ : sbox1j[1:4]=4'd10;
         2'b01 /*01 10*/ : sbox1j[1:4]=4'd12;
         2'b10 /*01 10*/ : sbox1j[1:4]=4'd9;
         2'b11 /*01 10*/ : sbox1j[1:4]=4'd7;
      endcase
      case (sbox1_sel[3:4]) // synopsys full_case parallel_case
         2'b00 /*10 10*/ : sbox1k[1:4]=4'd1;
         2'b01 /*10 10*/ : sbox1k[1:4]=4'd8;
         2'b10 /*10 10*/ : sbox1k[1:4]=4'd6;
         2'b11 /*10 10*/ : sbox1k[1:4]=4'd11;
      endcase
      case (sbox1_sel[3:4]) // synopsys full_case parallel_case
         2'b00 /*11 10*/ : sbox1l[1:4]=4'd12;
         2'b01 /*11 10*/ : sbox1l[1:4]=4'd7;
         2'b10 /*11 10*/ : sbox1l[1:4]=4'd10;
         2'b11 /*11 10*/ : sbox1l[1:4]=4'd0;
      endcase
      case (sbox1_sel[3:4]) // synopsys full_case parallel_case
         2'b00 /*00 11*/ : sbox1m[1:4]=4'd15;
         2'b01 /*00 11*/ : sbox1m[1:4]=4'd4;
         2'b10 /*00 11*/ : sbox1m[1:4]=4'd2;
         2'b11 /*00 11*/ : sbox1m[1:4]=4'd1;
      endcase
      case (sbox1_sel[3:4]) // synopsys full_case parallel_case
         2'b00 /*01 11*/ : sbox1n[1:4]=4'd6;
         2'b01 /*01 11*/ : sbox1n[1:4]=4'd11;
         2'b10 /*01 11*/ : sbox1n[1:4]=4'd5;
         2'b11 /*01 11*/ : sbox1n[1:4]=4'd8;
      endcase
      case (sbox1_sel[3:4]) // synopsys full_case parallel_case
         2'b00 /*10 11*/ : sbox1o[1:4]=4'd12;
         2'b01 /*10 11*/ : sbox1o[1:4]=4'd2;
         2'b10 /*10 11*/ : sbox1o[1:4]=4'd9;
         2'b11 /*10 11*/ : sbox1o[1:4]=4'd7;
      endcase
      case (sbox1_sel[3:4]) // synopsys full_case parallel_case
         2'b00 /*11 11*/ : sbox1p[1:4]=4'd11;
         2'b01 /*11 11*/ : sbox1p[1:4]=4'd14;
         2'b10 /*11 11*/ : sbox1p[1:4]=4'd0;
         2'b11 /*11 11*/ : sbox1p[1:4]=4'd13;
      endcase
end
/***************/
cry_mux4to1x2_4b u_sbox1w (.sel(sbox1_sel[1:2]),
                           .i0(sbox1a[1:4]), .i1(sbox1b[1:4]),
                           .i2(sbox1c[1:4]), .i3(sbox1d[1:4]),
                           .out(sbox1w[1:4])
                          );
cry_mux4to1x2_4b u_sbox1x (.sel(sbox1_sel[1:2]),
                           .i0(sbox1e[1:4]), .i1(sbox1f[1:4]),
                           .i2(sbox1g[1:4]), .i3(sbox1h[1:4]),
                           .out(sbox1x[1:4])
                          );
cry_mux4to1x2_4b u_sbox1y (.sel(sbox1_sel[1:2]),
                           .i0(sbox1i[1:4]), .i1(sbox1j[1:4]),
                           .i2(sbox1k[1:4]), .i3(sbox1l[1:4]),
                           .out(sbox1y[1:4])
                          );
cry_mux4to1x2_4b u_sbox1z (.sel(sbox1_sel[1:2]),
                           .i0(sbox1m[1:4]), .i1(sbox1n[1:4]),
                           .i2(sbox1o[1:4]), .i3(sbox1p[1:4]),
                           .out(sbox1z[1:4])
                          );
cry_mux4to1x2_4b u_sbox1 (.sel(sbox1_sel[5:6]),
                          .i0(sbox1w[1:4]), .i1(sbox1x[1:4]),
                          .i2(sbox1y[1:4]), .i3(sbox1z[1:4]),
                          .out(sbox1[1:4])
                         );
/***********************************************/
endmodule // cry_sbox1
```

What is claimed is:

1. A cryptography accelerator for performing cryptography operations, the cryptography accelerator comprising:
   a block cipher engine, operating at a first clock rate;
   surrounding logic coupled to the block cipher engine, the surrounding logic operating at a second clock rate different from the first clock rate; and
   a frequency synchronizer coupled to the block cipher engine and the surrounding logic, the frequency synchronizer configured to compensate for clock rate differences between the block cipher engine and surrounding logic by generating a synchronization pulse when a start signal is received from the surrounding logic, wherein the synchronization pulse is generated at the second clock rate and wherein the synchronization pulse is one cycle of the first clock wide and is centered around an edge of the first clock.

2. The cryptography accelerator of claim 1, wherein the first clock rate is faster than the second clock rate.

3. The cryptography accelerator of claim 1, wherein the the synchronization pulse signals the block cipher engine to begin performing cryptography operations.

4. The cryptography accelerator of claim 1, wherein the frequency synchronizer signals the surrounding logic to read processed data from the block cipher engine after cryptography operations are performed.

5. The cryptography accelerator of claim 1, wherein the frequency synchronizer uses a frequency clock associated with the surrounding logic to synchronize a 1×clock signal and a higher multiple clock signal associated with the block cipher engine.

6. The cryptography accelerator of claim 5, wherein a negative edge of the 1×clock is used to catch the start signal.

7. The cryptography accelerator of claim 6, wherein the higher multiple signal is a 3×clock and a second positive edge of the 3×clock is used to catch the start signal.

* * * * *